US010520939B2

(12) United States Patent
Sato et al.

(10) Patent No.: US 10,520,939 B2
(45) Date of Patent: Dec. 31, 2019

(54) DRIVE ASSIST APPARATUS

(71) Applicant: TOYOTA JIDOSHA KABUSHIKI KAISHA, Aichi-ken (JP)

(72) Inventors: Jun Sato, Susono (JP); Masahiro Iwasaki, Numazu (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 280 days.

(21) Appl. No.: 15/642,485

(22) Filed: Jul. 6, 2017

(65) Prior Publication Data

US 2017/0308083 A1  Oct. 26, 2017

Related U.S. Application Data

(63) Continuation of application No. 15/000,391, filed on Jan. 19, 2016, now Pat. No. 9,740,203.

(30) Foreign Application Priority Data

Feb. 20, 2015  (JP) ................................. 2015-031917

(51) Int. Cl.
*G05D 1/00* (2006.01)
*B60W 50/14* (2012.01)
(Continued)

(52) U.S. Cl.
CPC .......... *G05D 1/0061* (2013.01); *B60Q 5/005* (2013.01); *B60Q 9/00* (2013.01); *B60W 40/08* (2013.01);
(Continued)

(58) Field of Classification Search
CPC ........ G05D 1/0061; G07C 5/02; B60Q 5/005; B60Q 9/00; B60W 40/08; B60W 50/14;
(Continued)

(56) References Cited

U.S. PATENT DOCUMENTS 5,774,069 A * 6/1998 Tanaka ..................... B60T 7/12
180/167
8,670,891 B1 3/2014 Szybalski
(Continued)

FOREIGN PATENT DOCUMENTS

DE 102012112802 A1 6/2014
EP 2314489 A1 4/2011
(Continued)

*Primary Examiner* — Adam R Mott
(74) *Attorney, Agent, or Firm* — Sughrue Mion, PLLC

(57) ABSTRACT

A drive assist apparatus includes an arrival window time calculation unit configured to calculate an arrival window time before the vehicle arrives at a switching completion point, a driving concentration degree estimation unit configured to estimate a driving concentration degree of a driver based on a state of the driver when the arrival window time is equal to or shorter than a predetermined time, and a stimulation providing unit configured to provide a stimulus to the driver according to the driving concentration degree. In a case where the driving concentration degree is equal to or less than a threshold value set in advance, the stimulation providing unit provides a stimulus to the driver, which is stronger than that in a case where the driving concentration degree is greater than the threshold value, or provides a stronger stimulus to the driver in accordance with reduction in the driving concentration degree.

8 Claims, 9 Drawing Sheets

(51) Int. Cl.
  *B60W 40/08* (2012.01)
  *B60Q 5/00* (2006.01)
  *B60Q 9/00* (2006.01)
  *G07C 5/02* (2006.01)
  *B60W 50/00* (2006.01)

(52) U.S. Cl.
  CPC ............... *B60W 50/14* (2013.01); *G07C 5/02* (2013.01); *B60W 2040/0818* (2013.01); *B60W 2040/0872* (2013.01); *B60W 2040/0881* (2013.01); *B60W 2050/0072* (2013.01); *B60W 2550/402* (2013.01)

(58) Field of Classification Search
  CPC . B60W 2040/0881; B60W 2040/0818; B60W 2040/0872; B60W 2550/402; B60W 2050/0072; B60W 2050/007–0074; B60W 50/16; B60W 2050/143; B60W 2050/146; B60K 2370/175
  See application file for complete search history.

(56) References Cited

U.S. PATENT DOCUMENTS

| | | |
|---|---|---|
| 9,290,174 B1 | 3/2016 | Zagorski |
| 2004/0044293 A1 | 3/2004 | Burton |
| 2009/0268022 A1 | 10/2009 | Omi |
| 2014/0088814 A1* | 3/2014 | You ...................... G05D 1/0061 701/23 |
| 2014/0156133 A1* | 6/2014 | Cullinane ............ B60W 30/00 701/23 |
| 2014/0300479 A1 | 10/2014 | Wolter et al. |
| 2014/0303827 A1* | 10/2014 | Dolgov ................. B60W 30/00 701/23 |

FOREIGN PATENT DOCUMENTS

| | | |
|---|---|---|
| JP | H09-161196 A | 6/1997 |
| JP | 10-309960 A | 11/1998 |
| JP | 2002-251690 A | 9/2002 |
| JP | 2009-048605 A | 3/2009 |
| JP | 2011131838 A | 7/2011 |
| WO | 2016/016037 A1 | 2/2016 |

* cited by examiner

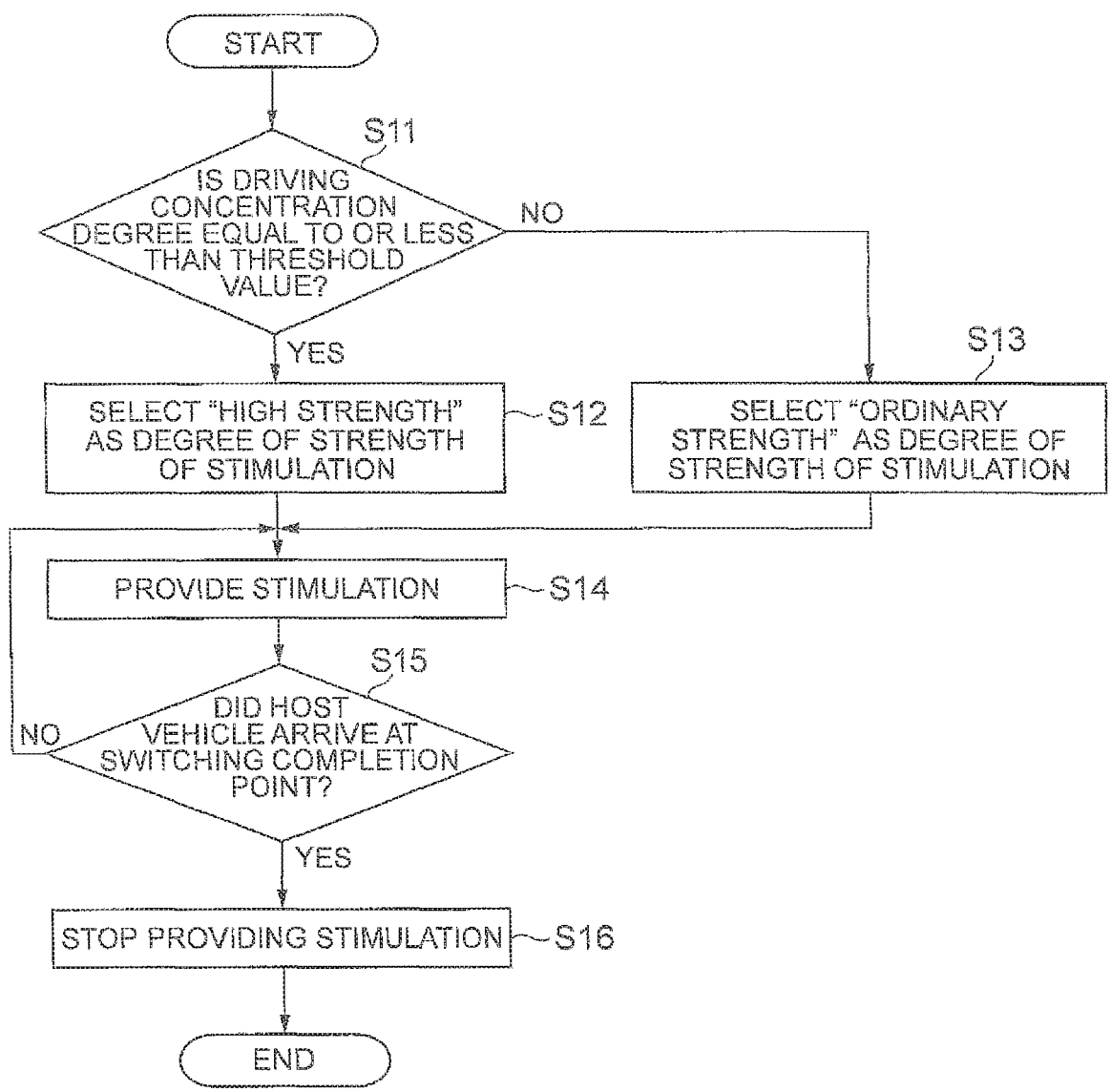

Fig.5

|  |  | ARRIVAL WINDOW TIME | |
|---|---|---|---|
|  |  | EQUAL TO OR LONGER THAN REFERENCE TIME | SHORTER THAN REFERENCE TIME |
| DRIVING CONCENTRATION DEGREE | EQUAL TO OR GREATER THAN THRESHOLD VALUE | FIRST STRENGTH | FIRST STRENGTH |
|  | EQUAL TO OR LESS THAN THRESHOLD VALUE | SECOND STRENGTH | THIRD STRENGTH |

DRIVE ASSIST APPARATUS

CROSS-REFERENCE TO RELATED APPLICATIONS

This is a continuation of U.S. patent application Ser. No. 15/000,391, filed Jan. 19, 2016 (allowed), which claims priority to Japanese Application No. P2015-031917, filed Feb. 20, 2015. The entire disclosures of the prior applications are considered part of the disclosure of the accompanying continuation application, and are hereby incorporated by reference.

TECHNICAL FIELD

The present disclosure relates to a drive assist apparatus.

BACKGROUND

As a technology relating to a drive assist apparatus in the related art, an automatic guidance and control system disclosed in Japanese Unexamined Patent Application Publication No. 2002-251690 is known. At a time when shifting a road section from an autonomous drive section to a manual drive section, the automatic guidance and control system disclosed in Japanese Unexamined Patent Application Publication No. 2002-251690 checks with the driver whether or not a shifting to manual driving is possible via a human machine interface (HMI) when a vehicle passes through an autonomous drive ending notice marker. In a case where it cannot be checked via the HMI whether or not shifting is possible, the vehicle is automatically guided to an emergency shelter lane.

SUMMARY

In the above-described technology in the related art, at the time of switching a driving mode from autonomous driving to manual driving, in a case where the state of the driver is inappropriate (for example, a state in which a degree of wakefulness of the driver is low), the vehicle is automatically guided to the emergency shelter lane, and thus, it may be difficult to smoothly continue driving.

An object of exemplary embodiments of the present disclosure is to provide a drive assist apparatus in which smooth driving can be continued at the time when the driving mode is switched from autonomous driving to manual driving.

A drive assist apparatus according to an exemplary embodiment of the present disclosure is a drive assist apparatus that completes switching of a driving mode of a vehicle from autonomous driving to manual driving at a switching completion point. The device includes an arrival window time calculation unit configured to calculate an arrival window time before the vehicle arrives at the switching completion point based on a current position and speed of the vehicle, a driving concentration degree estimation unit configured to estimate a driving concentration degree of a driver based on a state of the driver of the vehicle when the arrival window time is equal to or shorter than a predetermined time, and a stimulation providing unit configured to provide a stimulus to the driver according to the driving concentration degree. In a case where the driving concentration degree is equal to or less than a threshold value set in advance, the stimulation providing unit provides a stimulus to the driver, which is stronger than that in a case where the driving concentration degree is greater than the threshold value, or provides a stronger stimulus to the driver in accordance with reduction in the driving concentration degree.

In this drive assist apparatus of an exemplary embodiment, in a case where the driving concentration degree of the driver is equal to or less than the threshold value, the stimulus which is stronger than that in a case where the driving concentration degree of the driver is greater than the threshold value is provided to the driver. Alternatively, the stronger stimulus is provided to the driver in accordance with reduction in the driving concentration degree. In this way, before arriving at the switching completion point, it is possible to reliably return the state of the driver to the state in which appropriate driving can be performed (that is, a state suitable for manual driving). As a result, when the driving mode is switched from the autonomous driving to the manual driving, smooth driving can be continued.

In a drive assist apparatus according to an exemplary embodiment of the present disclosure, in a case where the arrival window time is equal to or longer than a reference time which is shorter than the predetermined time and the driving concentration degree is equal to or less than the threshold value, the stimulation providing unit may give a stimulus having a second strength which is stronger than the first strength to the driver, in a case where the arrival window time is equal to or longer than a reference time which is shorter than the predetermined time and the driving concentration degree is equal to or less than the threshold value, may give a stimulus having a second strength which is stronger than the first strength to the driver, and in a case where the arrival window time is shorter than the reference time and the driving concentration degree is equal to or less than the threshold value, may give a stimulus having a third strength which is stronger than the second strength to the driver. According to a configuration consistent with an exemplary embodiment, a stimulus that corresponds to the state of the driver and the arrival window time can be provided to the driver, and thus, before arriving at the switching completion point, it is possible to further reliably return the state of the driver to the state in which appropriate driving can be performed.

A drive assist apparatus according to an exemplary embodiment of the present disclosure may further include a return time estimation unit configured to estimate a psychological side return time which is a time required for a state of psychological side of the driver to be returned to a state suitable for manual driving, a cognitive side return time which is a time required for a state of cognitive side of the driver to be returned to the state suitable for the manual driving, and an operative side return time which is a time required for a state of operative side of the driver to be returned to the state suitable for the manual driving, based on the driving concentration degree. In a case where a total time of the psychological side return time, the cognitive side return time, and the operative side return time is equal to or shorter than the predetermined time, the stimulation providing unit may give a psychological side returning stimulus which returns the state of psychological side of the driver to the state suitable for the manual driving, a cognitive side returning stimulus which returns the state of cognitive side of the driver to the state suitable for the manual driving, and an operative side returning stimulus which returns the state of operative side of the driver to the state suitable for the manual driving, in this order to the driver. In a case where the total time is longer than the predetermined time, the stimulation providing unit may give the psychological side returning stimulus, the cognitive side returning stimulus and the operative side returning stimulus to the driver by overlapping any of the psychological side returning stimulus, the cognitive side returning stimulus, and the operative side returning stimulus with one another such that an aggregated time of providing the stimulation becomes the predetermined time. According to this configuration, the state of the driver can reliably be returned to the proper state before arriving at the switching completion point, and thus, it is possible to provide a stimulus having an effective stimulation pattern according to the detailed state of the driver.

BRIEF DESCRIPTION OF THE DRAWINGS

FIG. 3 is a flowchart illustrating stimulating processing of the drive switching ECU in FIG. 1.

FIG. 5 is a diagram illustrating an example of a stimulation strength map in a drive assist apparatus according to a second embodiment.

DETAILED DESCRIPTION

Hereinafter, exemplary embodiments of the present disclosure will be described in detail using the drawings. In the description, the same reference signs will be provided to the same or equivalent elements and the descriptions thereof will not be repeated.

[First Embodiment]

Figure 1:
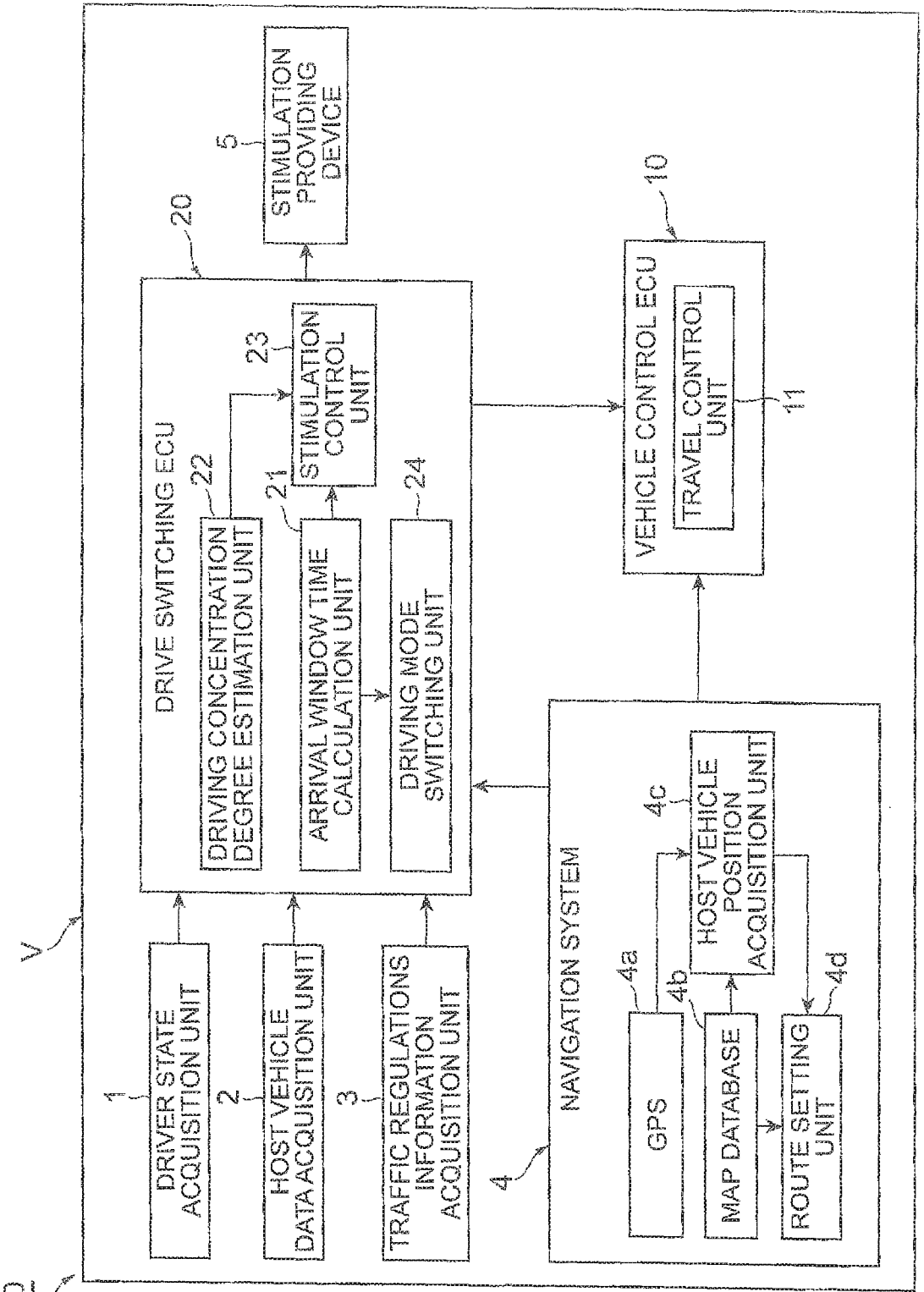
FIG. 1 is a block diagram illustrating a configuration of a drive assist apparatus according to a first embodiment.

FIG. 1 is a block diagram illustrating a configuration of a drive assist apparatus 100 in a first embodiment. As illustrated in FIG. 1, the drive assist apparatus 100 is mounted on a host vehicle (vehicle) V such as an automobile. During autonomous driving of the host vehicle V, the drive assist apparatus 100 completes switching of the driving mode from autonomous driving to a manual driving at a switching completion point. The drive assist apparatus 100 includes a driver state acquisition unit 1, a host vehicle data acquisition unit 2, a traffic regulations information acquisition unit 3, a navigation system 4, a stimulating device 5, a vehicle control electronic control unit (ECU) 10, and a drive switching ECU 20.

The driver state acquisition unit 1 is a device that acquires a state of a driver of the host vehicle V. The driver state acquisition unit 1 transmits the acquired state of the driver to the drive switching ECU 20. The driver state acquisition unit 1 may include, for example, a physiological measurement device, a seat position sensor, a seat pressure sensor, a driver monitoring camera, a human machine interface (HMI), and a system continuous-use-time counter.

The physiological measurement device detects physiological data of the driver as the state of the driver. Specifically, the physiological measurement device may detect a heart rate, a blood pressure, a body temperature, brain waves, a breathing state, a skin electrical activity as the state of the driver. The seat position sensor detects a seat position of the driver as the state of the driver. The seat pressure sensor detects a pressure of the seat of the driver as the state of the driver.

The driver monitoring camera may detect a facial expression, an eye movement, an eye-closing time and a pupil diameter change of the driver as information relating to the state of the driver. The HMI may output a sound or display requesting the driver to perform a selection (for example, a random task), and detect a selection reaction time to be used as information relating to the state of the driver, which is a reaction time for the driver to perform the selection. The HMI may detect a dialog reaction of the driver as information relating to the state of the driver, which is a reaction to the dialog, by outputting a voice and recognizing the response voice of the driver with respect to the voice. The system continuous-use-time counter detects a system continuous-use-time as information relating to the state of the driver, which is a time the driver has continuously used autonomous driving.

The host vehicle data acquisition unit 2 is a device that detects host vehicle data which indicates a travelling state of the host vehicle V. The host vehicle data acquisition unit 2 transmits the detected host vehicle data to the drive switching ECU 20. The host vehicle data acquisition unit 2 may include, for example, a vehicle speed sensor, an acceleration sensor, and a yaw rate sensor. The vehicle speed sensor is a detector that detects a speed (vehicle speed) of the host vehicle V to be used as the host vehicle data. As the vehicle speed sensor, for example, a vehicle wheel speed sensor may be used, which is provided on the vehicle wheels of the host vehicle V or on a drive shaft which rotates integrally with the vehicle wheels.

The acceleration sensor is a detection device which is a detector that may detect an acceleration of the host vehicle V to be used as the host vehicle data. The acceleration sensor includes, for example, a longitudinal acceleration sensor that detects the acceleration of the host vehicle V in the longitudinal direction and a lateral acceleration sensor that detects the lateral acceleration of the host vehicle V. The yaw rate sensor is a detector that detects a yaw rate (rotation angle speed) around the vertical axis of the center of gravity of the host vehicle V as the host vehicle data. For example, a gyro-sensor can be used as the yaw rate sensor.

The traffic regulations information acquisition unit 3 is a device that acquires traffic regulations information relating to traffic regulations around the host vehicle V from the outside. The traffic regulations information acquisition unit 3 transmits the acquired traffic regulations information to the drive switching ECU 20. The traffic regulations information acquisition unit 3 may include any one of a, road-to-vehicle communication system and a vehicle-to-vehicle communication system. The road-to-vehicle communication system is a system that performs communication between road and the vehicle. The vehicle-to-vehicle communication system is a system that performs communication between the host vehicle V and another vehicle around the host vehicle V.

The navigation system 4 is an apparatus that performs guidance to a destination set by the driver of the host vehicle V for the driver of the host vehicle V. The navigation system 4 includes a global positioning system (GPS) 4a, a map database 4b, a host vehicle position acquisition unit 4c and a route setting unit 4d. The GPS 4a measures the position (for example, latitude and longitude of the host vehicle V) of the host vehicle V by receiving signals from three or more GPS satellites.

The map database 4b is a database including map information. The map database 4b is, for example, formed in a hard disk drive (HDD) mounted on the host vehicle V. For example, the map information includes position information of roads, shape information of roads (for example, a curve, a type straight section, a curvature of a curve), position information of intersections and branch points. The host vehicle position acquisition unit 4c acquires position information relating to the host vehicle V in the map information from the output of the GPS 4a and the map information in the map database 4b. The route setting unit 4d sets a target route on which the host vehicle V travels to reach the destination based on the position information of the host vehicle V and the map information in the map database 4b. The target route may be a specified preferable lane in a section having a plurality of lanes.

In addition, the navigation system 4 performs notification to the driver of the target route by display on a display device or by a sound output from a speaker. The navigation system 4 transmits the position information and target route information of the host vehicle V to the vehicle control ECU 10 and the drive switching ECU 20. The navigation system 4 may be stored in a computer installed in a facility such as an information processing center which is capable of communicating with the host vehicle V.

The stimulating device 5 is a device that provides stimulation to the driver based on a control signal from the drive switching ECU 20. The stimulating device 5 may comprise any of a sound generation unit, a light generation unit, a vibration generation unit, and an interior movement unit. The sound generation unit provides any of a voice and a buzzer sound to the driver as a stimulus. The sound generation unit is, for example, formed of a speaker of the HMI. The light generation unit provides a light to the driver as a stimulus. The light generation unit is, for example, formed of a display unit of the HMI. The vibration generation unit provides a vibration to the driver as a stimulus. The vibration generation unit is, for example, formed of a vibration motor built into the driver's seat.

The interior movement unit provides a stimulus to the driver by causing any of an arm rest, a seat position, a steering wheel, and pedals (hereinafter, referred to as "interior components") to move. In other words, the interior movement unit provides the moving of the interior components to the driver as a stimulus. The interior movement unit is configured to include an actuator that adjusts the position of the interior components.

The vehicle control ECU 10 and the drive switching ECU 20 are electronic control units that may include a central processing unit (CPU), a read only memory (ROM), a random access memory (RAM), and the like. The vehicle control ECU 10 and the drive switching ECU 20 execute various controls by loading a program stored in the ROM into the RAM and by being executed by the CPU. The vehicle control ECU 10 and the drive switching ECU 20 may be configured to include a plurality of electronic control units, or may be configured to be combined into a single electronic control unit.

The vehicle control ECU 10 includes a travel control unit 11. The travel control unit 11 generates a travel path of the host vehicle V based on, for example, the target route from the navigation system 4 and the position information of the host vehicle V, and the surroundings information from a surroundings monitoring sensor (not illustrated). The travel path is a trajectory in which the host vehicle V travels in a travel lane along the target route. The travel control unit 11 generates a travel plan according to the generated travel path. The travel control unit 11 outputs the generated travel plan as a plurality of groups in which the travel path of the host vehicle V is formed of two elements such as a target position p in coordinates fixed to the host vehicle V and a vehicle speed v at the target point, that is, outputs a travel plan including a plurality of coordinates (p, v). Each target position p includes information of x and y positions or equivalent information on the coordinates fixed to at least the host vehicle V. The travel plan is not particularly limited as long as the travel plan represents the behavior of the host vehicle V.

The travel control unit 11 causes the host vehicle V to autonomously drive based on the generated travel plan. The travel control unit 11 outputs a control signal according to the travel plan to the actuator. The actuator includes at least a throttle actuator, a brake actuator, and a steering actuator.

The driving mode switching ECU 20 includes an arrival window time calculation unit 21, a driving concentration degree estimation unit 22, a stimulation control unit 23, and a driving mode switching unit 24. The arrival window time calculation unit 21 calculates an arrival window time which is a window time until the host vehicle V arrives at a switching completion point. The switching completion point is a point on the target route where the switching of the driving mode is completed from autonomous driving to manual driving. In other words, the switching completion point is a point where the transfer of the driving mode from the autonomous driving to the manual driving is completed. That is, a switching completion point is a point where the autonomous driving assist by the vehicle control ECU 10 is ended. For example, an exit point on a highway, a starting point of the traffic regulations indicating bad weather, or a starting point of the traffic regulations indicating a traffic accident can be included in the switching completion point.

The arrival window time calculation unit 21 determines the presence or absence of a switching completion point on the target route based on the target route set by the route setting unit 4d of the navigation system 4, the map information in the map database 4b, and the traffic regulations information acquired by the traffic regulations information acquisition unit 3. In a case where the switching completion point is present, the arrival window time calculation unit 21 calculates an arrival window time based on the switching completion point, the host vehicle data acquired by the host vehicle data acquisition unit 2, and the position information of the host vehicle V acquired by the navigation system 4.

When the arrival window time calculated by the arrival window time calculation unit 21 is equal to or less than a predetermined time set in advance, the driving concentration degree estimation unit 22 estimates a driving concentration degree of the driver based on the state of the driver acquired by the driver state acquisition unit 1. The predetermined time is a time from the starting of switching (transfer) of the driving mode from the autonomous driving to the manual driving to the completion thereof. That is, the switching of the driving mode should be completed within the predetermined time. The predetermined time may be a fixed value or may be a varying value. The driving concentration degree is an index indicating a degree to which the driver is concentrating on the driving of the host vehicle V. The driving concentration degree includes, for example, any of a degree of tension, a degree of wakefulness, a degree of drowsiness, a driving operation adaptability, a degree of fatigue, a degree of inattentiveness, a concentration and a degree of emotion. The driving concentration degree is a value obtained by integrating any of the degree of tension, the degree of wakefulness, the degree of drowsiness, the driving operation adaptability, the degree of fatigue, the degree of inattentiveness, the concentration ability and the degree of emotion (hereinafter, each of these will be referred to as "parameters"). For example, the driving concentration degree estimation unit 22 may estimate a driving concentration degree from a sum of a sequence of numbers in which each of the parameters are weighted by weights accorded to each of the parameters. Instead of this or in addition to this, for example, the driving concentration degree estimation unit 22 may estimate a driving concentration degree from a sum of a sequence of numbers in which each of the parameters are multiplied by coefficients (including positive values or negative values) according to each of the parameters.

The degree of tension is an index indicating a degree of tension of the driver. The degree of tension is a driving concentration degree relating to a psychological side of the driver. The degree of wakefulness is an index indicating a degree of wakefulness of the driver. The degree of wakefulness is a driving concentration degree relating to a psychological side of the driver. The degree of drowsiness is an index indicating a drowsiness of the driver. The degree of drowsiness is a driving concentration degree relating to a psychological side of the driver. The driving operation adaptability is an index indicating a degree of adaptation to the driving operation of the host vehicle V. The driving operation adaptability is a driving concentration degree relating to an operational side (physical side) of the driver.

The degree of fatigue is an index indicating a degree of fatigue of the driver. The degree of fatigue is a driving concentration degree relating to an operational side of the driver. The degree of inattentiveness is an index indicating a frequency of inattentiveness of the driver. The degree of inattentiveness is a driving concentration degree relating to a cognition side of the driver. The concentration ability is an index indicating an ability of a driver to focus attention on a matter. The concentration ability is a driving concentration degree relating to a psychological side of the driver. The degree of emotion is an index indicating an increase of emotion of the driver. The degree of emotion is a driving concentration degree relating to a psychological side of the driver. The driving concentration degree estimation unit 22 in the first embodiment may estimate the driving concentration degree of the driver based on the state of the driver, specifically, as set forth in the description below.

The driving concentration degree estimation unit 22 determines a dominance of sympathetic or parasympathetic nervous activity using L/F and H/F based on the heart rate of the driver, and estimates a degree of tension based on the determination result. L/F (low frequency) is a mid-frequency component of the heart rate variability (for example, 0.05 to 0.20 Hz) and H/F (high frequency) is a high-frequency component of the heart rate variability (for example, 0.20 to 0.35 Hz). The H/F component is influenced by parasympathetic nervous activity caused by breathing and the L/F component is influenced by sympathetic and parasympathetic nervous activity. L/F and the H/F are used as indices for the sympathetic nerve function. The driving concentration degree estimation unit 22 estimates a degree of wakefulness based on a blood pressure of the driver. When the degree of wakefulness decreases, the blood pressure increases according to such a decrease. The driving concentration degree estimation unit 22 estimates a degree of drowsiness based on a body temperature of the driver. When the degree of drowsiness increases, the body temperature decreases. The driving concentration degree estimation unit 22 estimates a transition time from the current body posture to a driving posture based on the seat position of the driver's seat, and then estimates a driving operation adaptability based on the transition time. The driving concentration degree estimation unit 22 estimates a seating surface pressure of the driver's seat based on the seat pressure, and then estimates a degree of fatigue based on the seating surface pressure.

The driving concentration degree estimation unit 22 performs a subjective determination of an image based on the driver's face, and estimates the degree of drowsiness based on the subjective determination result. The driving concentration degree estimation unit 22 estimates the degree of drowsiness based on the driver's eye movement from a fact that a low-frequency component content ratio has a correlation with drowsiness. The driving concentration degree estimation unit 22 calculates line of sight dispersion and a retention time based on the driver's eye movement, and estimates the degree of inattentiveness based on the line of sight dispersion and the retention time. The driving concentration degree estimation unit 22 obtains an eye closure time rate of the driver during a constant time based on the eye closure time of the driver, and estimates the degree of drowsiness based on the eye closure time rate.

The driving concentration degree estimation unit 22 calculates a content ratio of an α wave and a θ wave based on brain waves of the driver, and estimates the degree of wakefulness based on the content ratio. The driving concentration degree estimation unit 22 calculates an electric potential relating to an eyeball retention time based on the brain waves of the driver, and estimates the degree of inattentiveness based on the electric potential relating to the eyeball retention time. The driving concentration degree estimation unit 22 determines an irregularity during the drowsiness such as a transient deep breathing based on a breathing state of the driver, and estimates the degree of drowsiness based on the determination result. The driving concentration degree estimation unit 22 determines a transient reaction on a mental sweating part based on an electrodermal activity of the driver, and estimates the degree of wakefulness based on the determination result. The driving concentration degree estimation unit 22 may estimate the degree of wakefulness of the driver based on a change of the driver pupil diameter. The pupil diameter (pupil area) decreases as the degree of wakefulness increases.

The driving concentration degree estimation unit 22 may also estimate the concentration based on the selection reaction time of the driver. The concentration tends to decrease as the selection reaction time increases. The driving concentration degree estimation unit 22 estimates the concentration based on the system continuous-use-time. The degree of concentration tends to decrease as the system continuous use time increases. The driving concentration degree estimation unit 22 performs the estimation using prosodic features based on a dialog reaction of the driver, and estimates the degree of wakefulness and the degree of emotion. The method of estimating the driving concentration degree by the driving concentration degree estimation unit 22 is not limited to the methods described above. The driving concentration degree estimation unit 22 can estimate the driving concentration degree using known methods.

The stimulation control unit 23 causes the stimulating device 5 to provide a stimulus corresponding to the driving concentration degree estimated by the driving concentration degree estimation unit 22 to the driver. The stimulation control unit 23 transmits a control signal corresponding to the driving concentration degree to the stimulating device 5. The stimulation control unit 23 determines whether or not the driving concentration degree is equal to or less than a threshold value set in advance. The threshold value is a value set in advance in order to appropriately determine whether to provide a weak stimulus or a strong stimulus to the driver. The threshold value may a fixed value or may be a varying value.

In a case where the driving concentration degree is equal to or less than the threshold value, the stimulation control unit 23 selects a high strength as a strength of the stimulus and provides a stimulus of high strength (strong stimulation) to the driver, and in a case where the driving concentration degree is greater than the threshold value, the stimulation control unit 23 selects an ordinary strength which is weaker than the high strength as the strength of the stimulus and provides a stimulus of ordinary strength (weak stimulation) to the driver. A stress provided to the driver increases as the strength of the stimulation increases (in other words, the stress provided to the driver decreases as the strength of the stimulation decreases).

The strong stimulation (stimulus of high strength) may be a sound, in the case where the sound generation unit of the stimulating device 5 generates a sound, which has at least one of a volume that is higher than a reference level, a height of sound (frequency) that is higher than a reference level, or a ringing interval that is shorter than a reference interval. The strong stimulation may be light, in the case where the light generation unit of the stimulating device 5 generates light, which has at least one of a brightness that is higher than a reference level or a blinking interval that is shorter than a reference interval. The strong stimulation may be a vibration, in the case where the vibration generation unit of the stimulating device 5 generates a vibration, which has at least one of a strength (amplitude) that is greater than a reference level, a frequency that is higher than a reference level, and an operation interval that is shorter than a reference interval. The strong stimulation may be a movement of the interior components in a transition time shorter than the reference time in the case where the interior components are moved by the interior movement unit of the stimulating device 5.

The weak stimulation (stimulus of ordinary strength) is a sound, in a case where the sound generation unit of the stimulating device 5 generates a sound, which has at least one of a volume that is equal to or lower than a reference level, a height of sound that is equal to lower than a reference level, and a ringing interval that is equal to or longer than a reference interval. The weak stimulation may be light, in the case where the light generation unit of the stimulating device 5 generates light, which has at least one of a brightness that is equal to or lower than a reference level or a blinking interval that is equal to or longer than a reference interval. The weak stimulation may be a vibration, in the case where the vibration generation unit of the stimulating device 5 generates a vibration, which has at least one of a strength that is equal to or less than a reference level, a frequency that is equal to or lower than a reference level, or an operation interval that is equal to or longer than a reference interval. The weak stimulation may be an interior component movement, in the case where the interior movement unit of the stimulating device 5 moves the interior components, in a transition time that is equal to or longer than a reference time.

The stimulation control unit 23 determines whether or not the host vehicle V arrives at the switching completion point based on the position information of the host vehicle V, and in the case where the host vehicle V arrives at the switching completion point, the stimulation control unit 23 stops the provided stimulation. That is, a stimulus is provided by the stimulation control unit 23 from a time of starting to the time of completing the switching of the driving mode from the autonomous driving to the manual driving (from a time when the arrival window time≤predetermined time until the time when the arrival window time=0).

The driving mode switching unit 24 controls the vehicle control ECU 10 and switches the driving mode of the host vehicle V from the autonomous driving to the manual driving. The driving mode switching unit 24 starts to switch the driving mode from the autonomous driving to the manual driving when the arrival window time calculated by the arrival window time calculation unit 21 is equal to or shorter than a predetermined time. Then, when the host vehicle V arrives at the switching completion point, the driving mode switching unit 24 completes the switching of the driving mode from the autonomous driving to the manual driving.

Autonomous driving is state in which, for example, the travelling of the host vehicle V is controlled using the travel plan. That is, autonomous driving is, for example, a state in which the driver's intervention is not performed and the travelling of the host vehicle V is realized only by the control by the vehicle control ECU 10 without driving operation being performed by the driver. Manual driving is a state in which an operation amount of the driving operation of the driver is reflected in the traveling of the host vehicle V. That is, manual driving is a state in which there is no intervention of the vehicle control ECU 10 and the operation amount of the driving operation of the driver is reflected in the traveling of the host vehicle V.

The driving mode switching unit 24 controls the vehicle control ECU 10 and causes the cooperative driving to be executed during the shift period from the time of starting to the time of completing the switching of the driving mode from the autonomous driving to the manual driving. Cooperative driving is a driving state in which the host vehicle V is caused to travel in cooperation with the driving operation based on, for example, the travel plan and the operation amount. That is, cooperative driving is a state in which both the driver and the vehicle control ECU 10 have a relation with the travelling of the host vehicle V, and a state in which the traveling of the host vehicle V is realized based on at least the operation amount of the driving operation of the driver in a state in which the intervention of the vehicle control ECU 10 can be performed.

Next, processing tasks executed by the drive assist apparatus 100 will be described with reference to the flowchart in FIG. 2 and FIG. 3.

Figure 2:
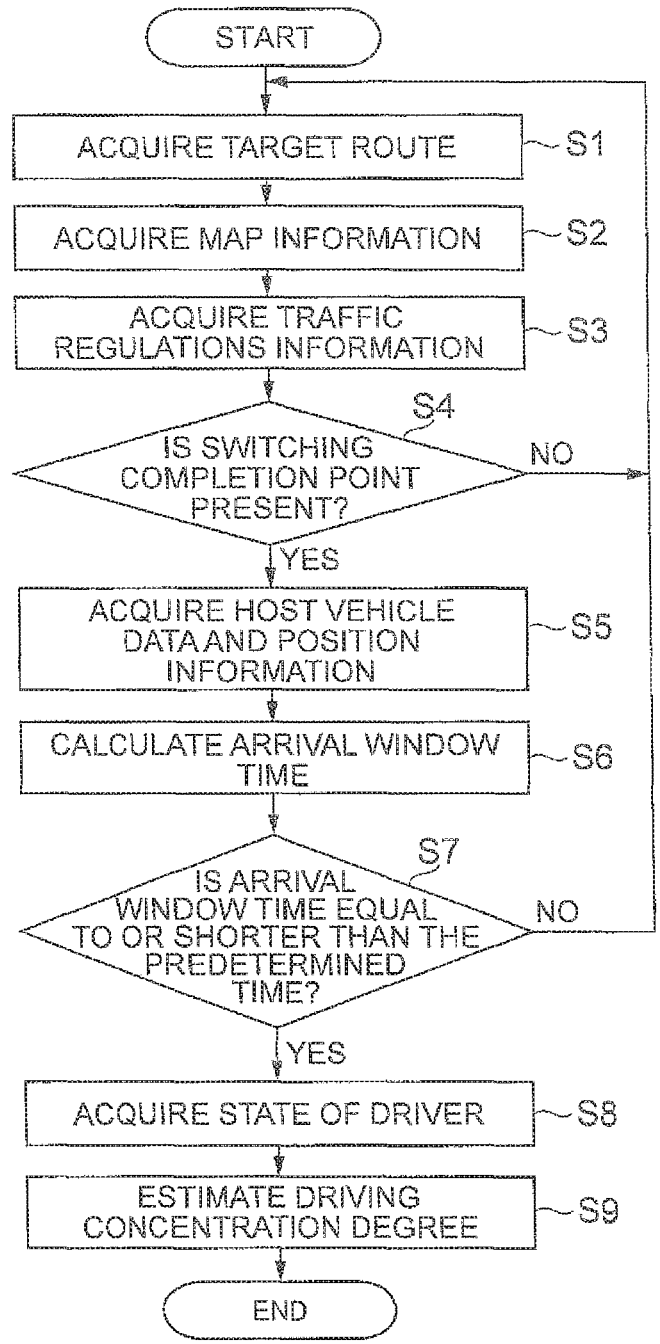
FIG. 2 is a flowchart illustrating driving concentration degree estimation processing of a drive switching ECU in FIG. 1.

FIG. 2 is a flowchart illustrating driving concentration degree estimation processing of a drive switching ECU 20 in FIG. 1. As illustrated in FIG. 2, the drive switching ECU 20 of the drive assist apparatus 100 may execute the following driving concentration degree estimation processing tasks during autonomous driving of the host vehicle V.

The target route set by the route setting unit 4d of the navigation system 4 is acquired (S1). The map information stored in the map database 4b of the navigation system 4 is acquired (S2). The traffic regulations information acquired by the traffic regulations information acquisition unit 3 is acquired (S3). Each of the processing tasks from S1 to S3 may take place in an arbitrary order.

The arrival window time calculation unit 21 determines the presence or absence of the switching completion point on the target route based on the target route, map information, and the traffic regulations information (S4). In a case of NO in S4, the process proceeds to S1. In a case of YES S4, the host vehicle data acquired by the host vehicle data acquisition unit 2 is received and acquired from the host vehicle data acquisition unit 2 and the position information of the host vehicle V acquired by the host vehicle position acquisition unit 4c of the navigation system 4 is received and acquired from the navigation system 4 (S5). The arrival window time is calculated by the arrival window time calculation unit 21 based on the switching completion point, the host vehicle data and the position information (S6).

It is determined whether or not the arrival window time is equal to or shorter than the predetermined time (S7). In a case of NO in S7, the process proceeds to S1. In a case of YES S7, the state of the driver acquired by the driver state acquisition unit 1 is received and acquired from the driver state acquisition unit 1 (S8). Then, the driving concentration degree is estimated by the driving concentration degree estimation unit 22 (S9).

FIG. 3 is a flowchart illustrating stimulation processing of the drive switching ECU 20 in FIG. 1. As illustrated in FIG. 3, in a case where the driving concentration degree is estimated by the driving concentration degree estimation unit 22, the drive switching ECU 20 of the drive assist apparatus 100 may execute the following stimulation processing.

It is determined whether or not the driving concentration degree is equal to or less than the threshold value by the stimulation control unit 23 (S11). In a case of YES in S11, "high strength" is selected as the strength of the stimulus by the stimulation control unit 23 (S12). In a case of NO in above-described S11, "ordinary strength" is selected as the strength of the stimulus (S13). The stimulation control unit 23 controls and causes the stimulating device 5 to provide the stimulus to the driver at the selected strength of stimulation (S14). Whether or not the host vehicle V arrives at the switching completion point is determined (S15). For example, in above-described S15, a current arrival window time is calculated by the arrival window time calculation unit 21, and in a case where the current arrival window time becomes zero, it is determined that the host vehicle V arrives at the switching completion point. In a case of NO in S15, the process proceeds to S14 and the stimulation is continuously provided to the driver. In a case of YES in S15, the stimulation control unit 23 stops providing the stimulation (S16).

As described above, in the drive assist apparatus 100 in the first embodiment, in a case where the driving concentration degree of the driver is equal to or less than the threshold value, a stimulus is provided to the driver which is stronger than that in a case where the driving concentration degree is greater than the threshold. In this way, before arriving at the switching completion point, it is possible to reliably return the state of the driver to the state in which appropriate driving can be performed (that is, a state suitable for manual driving). In other words, stimulation that corresponds to the state of the driver is provided to the driver such that the transition of the driving mode from the autonomous driving to the manual driving can reliably be performed, and then, when the transition is completed, it is possible to make the state in which the driving operation can be performed. Accordingly, when the driving mode is switched from the autonomous driving to the manual driving, smooth driving can be continued.

In the drive assist apparatus 100, in a case where the concentration degree of the driver is greater than the threshold value, a stimulus which is weaker is provided to the driver than that in a case where the driving concentration degree is equal to or less than the threshold value. In this way, compared to the usual drive assist apparatus that provides a strong stimulation at all times while assuming that the driver is in the worst state, it is possible to reduce stress provided to the driver due to the stimulus.

In the drive assist apparatus 100, it is possible to select the strength of the stimulus according to the state of the driver such that the predetermined time can be satisfied from the starting to the ending of the driving mode. In the drive assist apparatus 100, in a case where the driving concentration degree is high and it is easy to return to manual driving, it is possible to use a weak stimulus (wherein the stress is small). In the drive assist apparatus 100, in a case where the driving concentration degree is low and it takes a time to return to manual driving, it is possible to use a strong stimulus. In a situation in which autonomous driving has to be ended and in a case where such ending position is determined, the drive assist apparatus 100 can select an appropriate strength of stimulation according to the state of the driver.

Figure 4A:
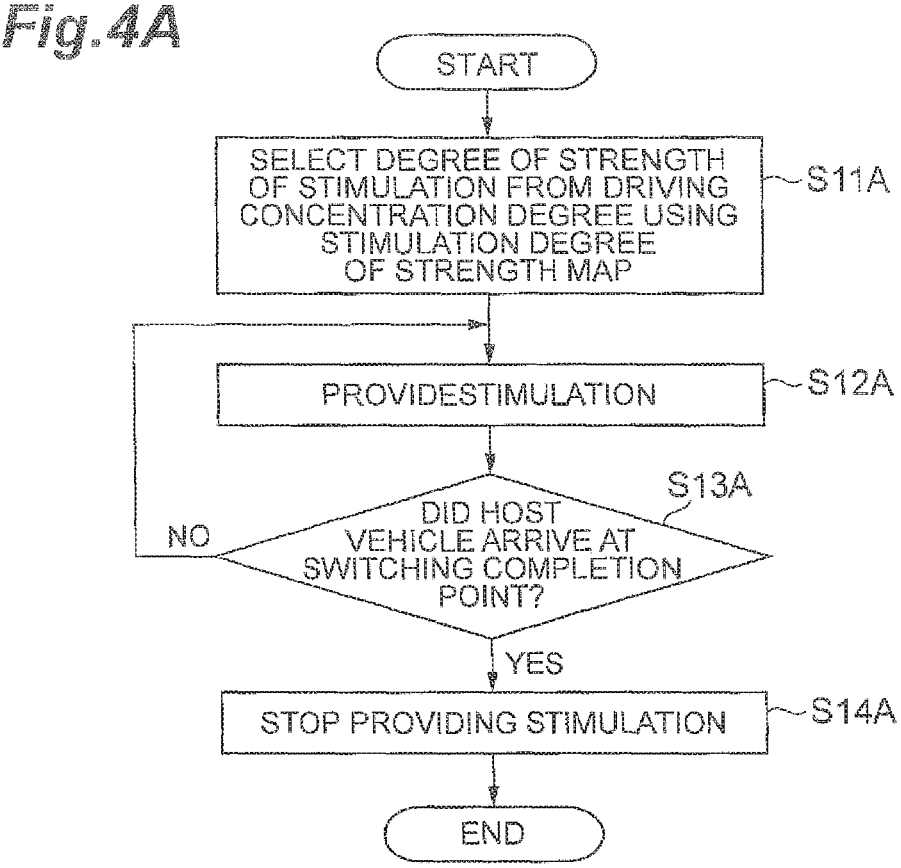
FIG. 4A is a flowchart illustrating stimulating processing in a modified example of the drive switching ECU in FIG. 1.
Figure 4B:
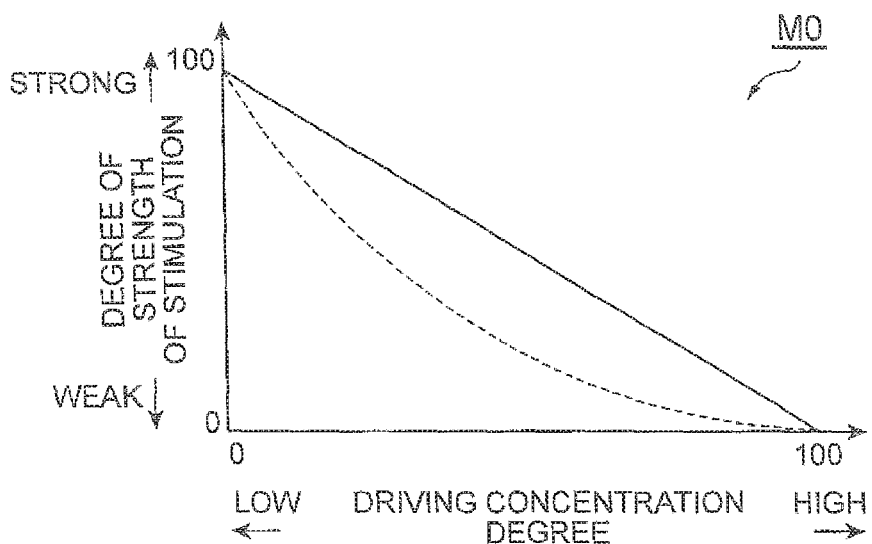
FIG. 4B is a diagram illustrating an example of a stimulation strength map in the modified example of the drive switching ECU.

FIG. 4A is a flowchart illustrating stimulating processing in a modified example of the drive switching ECU 20 in FIG. 1. FIG. 4B is a diagram illustrating an example of a stimulation strength map M0. As illustrated in FIG. 4B, a drive switching ECU 20 in the modification example includes a stimulation strength map MO in advance. The stimulation strength map M0 indicates a relationship between the driving concentration degree and the strength of the provided stimulation (strength of the stimulus). The stimulation strength map M0 is set such that the strength of stimulation increases as the driving concentration degree decreases. In the illustrated stimulation strength map M0, the driving concentration degree and the strength of stimulation are represented as index values with the possible maximum values as 100. When the driving concentration degree increases, it means that the driver concentrates on the driving. When the strength of the stimulus increases, it means that the stimulation is strong.

The driving concentration degree and the strength of stimulation in the stimulation strength map M0 have a linear relationship (refer to the solid line in FIG. 4B). However, the driving concentration degree and the strength of the stimulation may have a non-linear relationship (refer to the dashed line in FIG. 4B). As illustrated in FIG. 4A, in the drive switching ECU 20 in the modified example, in a case where the driving concentration degree is estimated by the driving concentration degree estimation unit 22, the stimulation processing described below is executed.

The stimulation control unit 23 selects the strength of the stimulus from the driving concentration degree with reference to the stimulation strength map M0 (S11A). In S11A described above, a stronger stimulus is selected as the driving concentration degree decreases. On the other hand, a weaker stimulus is selected as the driving concentration degree increases. The stimulation control unit 23 controls and causes the stimulating device 5 to provide the stimulus to the driver at the selected strength of stimulation (S12A). It is then determined whether or not the host vehicle V arrives at the switching completion point (S13A). For example, in S13A described above, the current arrival window time is calculated by the arrival window time calculation unit 21 and in a case where the current arrival window time is zero, it is determined that the host vehicle V arrives at the switching completion point. In a case of NO in S13A, the process proceeds to S12A and stimulation is continuously provided to the driver. In a case of YES in S13A, the stimulation control unit 23 stops providing stimulation (S14A).

[Second Embodiment]

Next, a second embodiment will be described. In the description of the second embodiment, points different from that in the first embodiment will be described and the duplicated description will not be repeated.

In a case where the driving concentration degree is greater than the threshold value, the stimulation control unit 23 causes the stimulating device 5 to provide a stimulus having a first strength to the driver. In a case where the arrival window time is equal to or longer than a reference time set in advance and the driving concentration degree is equal to or less than the threshold value, the stimulation control unit 23 causes the stimulating device 5 to provide a stimulus having a second strength which is stronger than the first strength to the driver. In a case where the arrival window time is shorter than the reference time and the driving concentration degree is equal to or less than the threshold value, the stimulation control unit 23 causes the stimulating device 5 to provide a stimulus having a third strength which is stronger than the first and second strength to the driver. The first to third strengths are set in advance and stored.

FIG. 5 is a diagram illustrating an example of a stimulation strength map M in the drive assist apparatus in the second embodiment. The drive switching ECU 20 includes the stimulation strength map M illustrated in FIG. 5 in advance. The stimulation strength map M indicates the relationships between the strength of the provided stimulation and the driving concentration degree and the arrival window time. In a case where the driving concentration degree is greater than the threshold value, the state of the driver is regarded as good, and thus, the first strength is set in the stimulation strength map M regardless of the arrival window time.

In a case where the driving concentration degree is equal to or less than the threshold value and the arrival window time is longer than the reference value, the state of the driver is regarded as bad and the arrival window time is regarded as long, the second strength is set in the stimulation strength map M. The reference time is a value set in advance in order to appropriately determine whether to provide a stimulus having the second strength or to provide a stimulus having the third strength. The reference time is value shorter than the predetermined time. The reference time may be a fixed value or may be a varying value.

In a case where the driving concentration degree is equal to or less than the threshold value and the arrival window time is shorter than the reference time, the state of the driver is regarded as bad and the arrival window time is regarded as short, and thus, the third strength is set in the stimulation strength map M. The stimulation control unit 23 selects the strength of the stimulus with reference to the stimulation strength map M based on the arrival window time calculated by the arrival window time calculation unit 21 and the driving concentration degree estimated by the driving concentration degree estimation unit 22.

Next, processing executed in the drive assist apparatus in the second embodiment will be described with reference to the flowchart in FIG. 6.

Figure 6:
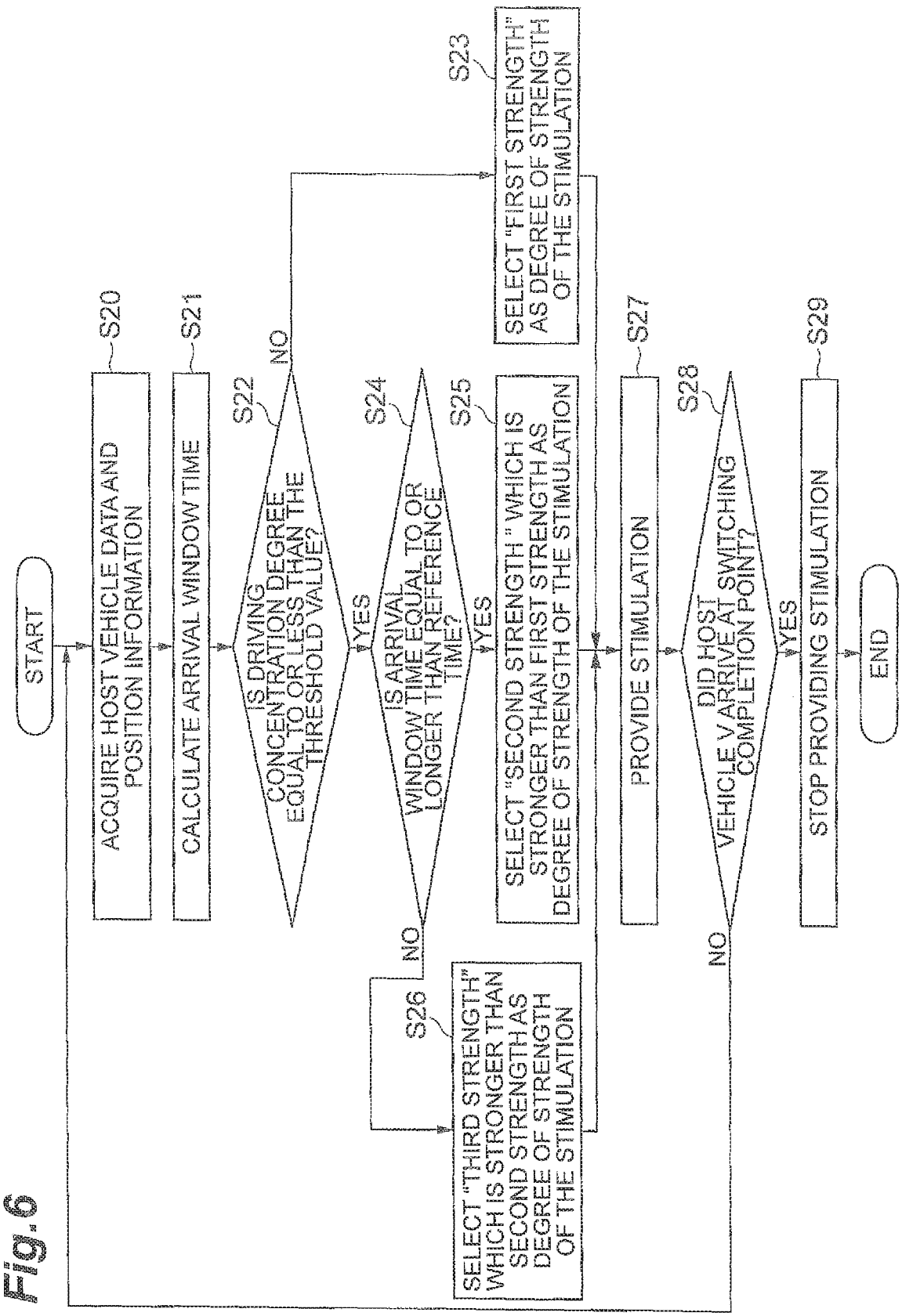
FIG. 6 is a flowchart illustrating stimulating processing of the drive switching ECU according to the second embodiment.

FIG. 6 is a flowchart illustrating stimulation processing of the drive switching ECU 20 in the second embodiment. As illustrated in FIG. 6, in a case where the driving concentration degree is estimated by the driving concentration degree estimation unit 22, the drive switching ECU 20 of the drive assist apparatus in the second embodiment executes the following stimulation processing instead of the stimulation processing in the first embodiment (refer to FIG. 3).

The host vehicle data is received and acquired from the host vehicle data acquisition unit 2 and the position information of the host vehicle V is received and acquired from the navigation system 4 (S20). The arrival window time is calculated by the arrival window time calculation unit 21 based on the switching completion point, the host vehicle data and the position information (S21).

The stimulation strength map M is acquired by the stimulation control unit 23 and the strength of stimulation is selected based on the arrival window time and the driving concentration degree with reference to the stimulation strength map M. That is, the stimulation control unit 23 determines whether or not the driving concentration degree is equal to or less than the threshold value (S22). In a case of NO in S22, the stimulation control unit 23 selects the "first strength" as the strength of the stimulus (S23). In a case of YES in S22, it is determined whether or not the arrival window time is equal to or longer than the reference time (S24). In a case of YES in S24, the stimulation control unit 23 selects the "second strength" as the strength of the stimulus (S25). In a case NO in S24, the stimulation control unit 23 selects the "third strength" as the strength of the stimulus (S26).

The stimulation control unit 23 controls and causes the stimulating device 5 to provide the stimulus to the driver at the selected strength of stimulation (S27). Whether or not the host vehicle V arrives at the switching completion point is determined (S28). For example, in S28 described above, the current arrival window time is calculated by the arrival window time calculation unit 21 and in a case where the current arrival window time is zero, it is determined that the host vehicle V arrives at the switching completion point. In a case of NO in S28, the process proceeds to S20. In a case of YES in S28, the stimulation control unit 23 stops providing stimulation (S29).

As described above, in the drive assist apparatus in the second embodiment also, the operational effect can be achieved, in which smooth driving can be continued when the driving mode is switched from the autonomous driving to the manual driving. In addition, in the drive assist apparatus in the second embodiment, stimulation that corresponds to the state of the driver and the arrival window time can be provided to the driver, and thus, before arriving at the switching completion point, it is possible to more reliably return the state of the driver to the state in which appropriate driving can be performed.

[Third Embodiment]

Next, a third embodiment will be described. In the description of the present embodiment, points different from that in the first embodiment will be described.

Figure 7:
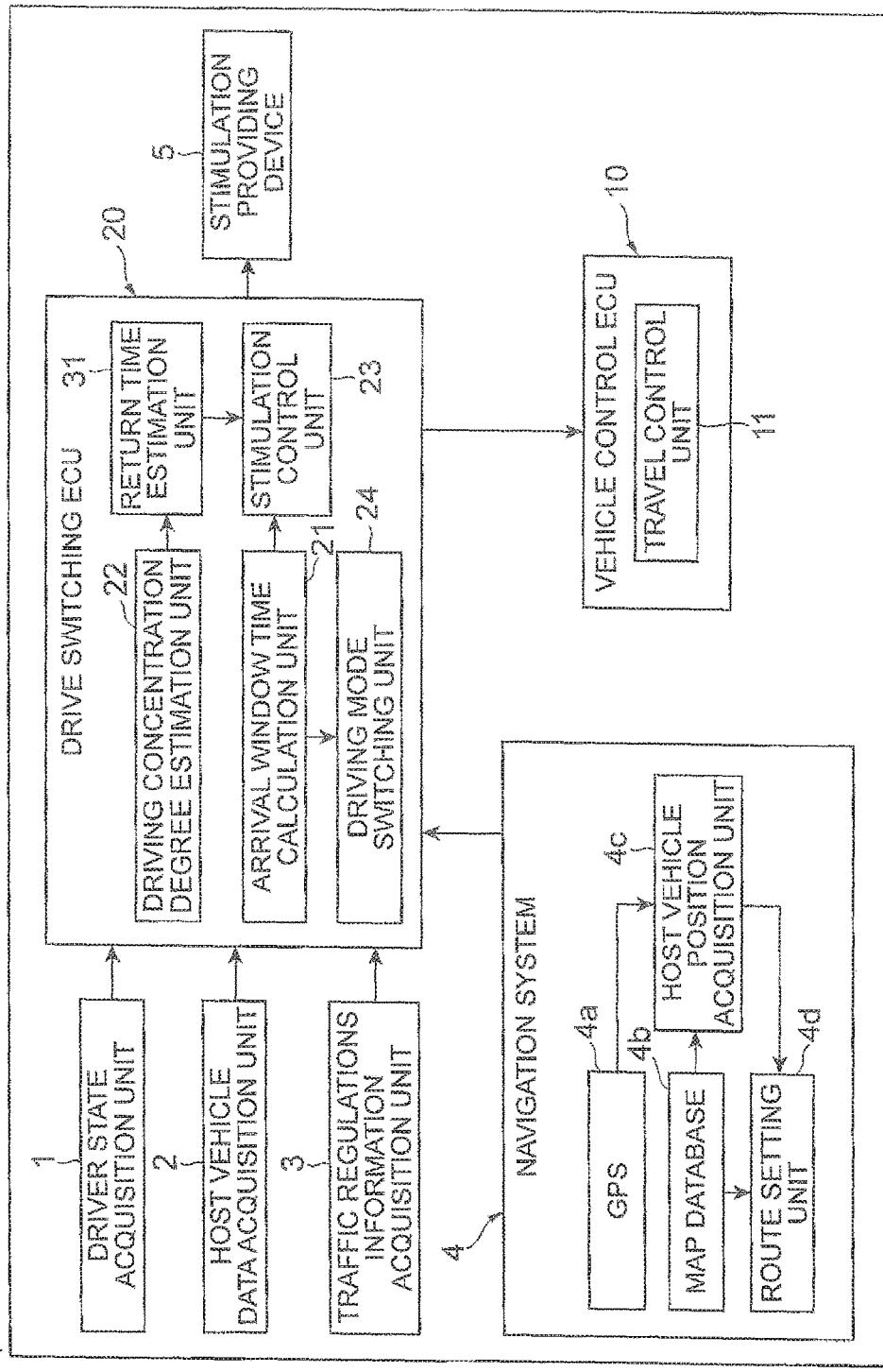
FIG. 7 is a block diagram illustrating a configuration of a drive assist apparatus according to a third embodiment.
Figure 8:
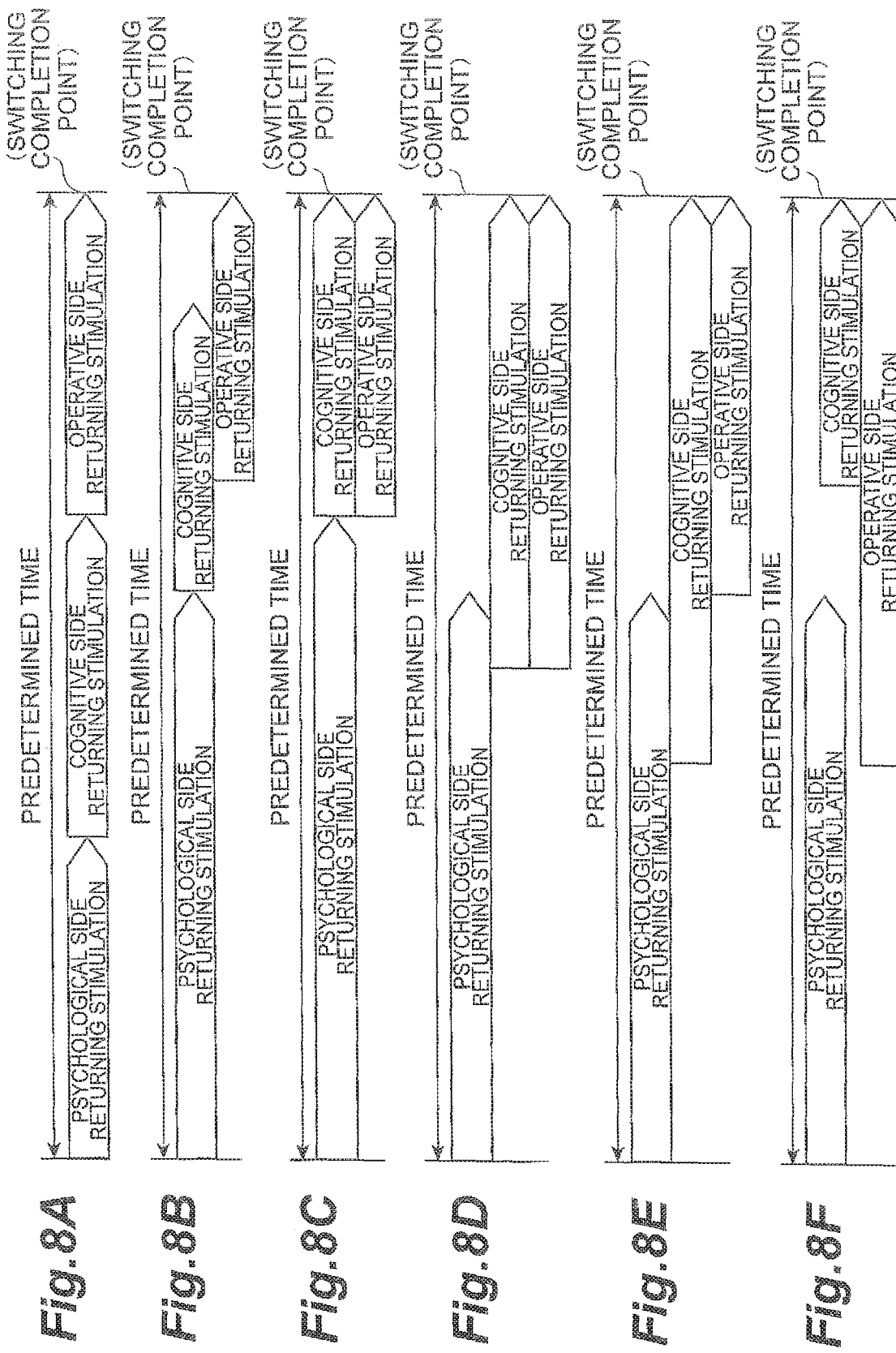
FIG. 8A is a diagram illustrating a first example of a stimulation pattern provided in the drive assist apparatus in FIG. 6.
FIG. 8B is a diagram illustrating a second example of a stimulation pattern provided in the drive assist apparatus in FIG. 6.
FIG. 8C is a diagram illustrating a third example of a stimulation pattern provided in the drive assist apparatus in FIG. 6.
FIG. 8D is a diagram illustrating a fourth example of a stimulation pattern provided in the drive assist apparatus in FIG. 6.
FIG. 8E is a diagram illustrating a fifth example of a stimulation pattern provided in the drive assist apparatus in FIG. 6.
FIG. 8F is a diagram illustrating a sixth example of a stimulation pattern provided in the drive assist apparatus in FIG. 6.

FIG. 7 is a block diagram illustrating a configuration of a drive assist apparatus 200. FIG. 8A is a diagram illustrating a first example of a stimulation pattern provided in the drive assist apparatus 200. FIG. 8B is a diagram illustrating a second example of a stimulation pattern provided in the drive assist apparatus 200. FIG. 8C is a diagram illustrating a third example of a stimulation pattern provided in the drive assist apparatus 200. FIG. 8D is a diagram illustrating a fourth example of a stimulation pattern provided in the drive assist apparatus 200. FIG. 8E is a diagram illustrating a fifth example of a stimulation pattern provided in the drive assist apparatus 200. FIG. 8F is a diagram illustrating a sixth example of a stimulation pattern provided in the drive assist apparatus 200. As illustrated in FIG. 7, the drive assist apparatus 200 in the third embodiment is different from the drive assist apparatus in the first embodiment in a point that the drive switching ECU 20 further includes a return time estimation unit 31.

The return time estimation unit 31 estimates each of a psychological side return time which is a time required for a state of a psychological side of the driver to be returned to a state suitable for the manual driving (hereinafter, referred to as "proper state"), a cognitive side return time which is a time required for a state of a cognitive side of the driver to be returned to the proper state, and an operative side return time which is a time required for a state of an operative side of the driver to be returned to the proper state based on the driving concentration degree. The psychological side is a viewpoint according to a driver's psyche, the cognitive side is a viewpoint according to the driver's recognition of the surroundings, and the operative side is a viewpoint according to a driving operation of the driver.

Among the parameters included in the driving concentration degree, the return time estimation unit 31 may extract one or more of the degree of tension, degree of wakefulness, degree of drowsiness, concentration, and degree of emotion which are measures of the driving concentration degree relating to the psychological side. With regard to each extracted parameter, the return time is calculated, which is the time it takes for the driving concentration degree to return to a value equal to or greater than a constant value by providing stimulation. The constant value is a value set in advance for each parameter in order to appropriately determine whether or not the state of the driver is the proper state. A sum of a sequence of numbers in which the return time for each parameter is weighted according to each parameter is estimated as the psychological side return time. Instead of or in addition to this, for example, the return time estimation unit 31 may estimate a sum of a sequence of numbers in which the return time of each parameter is multiplied by a coefficient (including a positive or negative value) according to the parameter, as the psychological side return time. Here, the psychological side return time is a time band having a width, and thus, has a range of values from a minimum psychological side return time Amin to a maximum psychological side return time Amax.

Among the parameters included in the driving concentration degree, the return time estimation unit 31 extracts the degree of inattentiveness which is the driving concentration degree relating to the cognitive side. The return time of the degree of inattentiveness is estimated as the cognitive side return time. Here, the cognitive side return time is a time band having a width, and thus, has a value from a minimum cognitive side return time Bmin to a maximum cognitive side return time Bmax.

Among the parameters included in the driving concentration degree, the return time estimation unit 31 may extract one or more of the driving operation adaptability and the degree of fatigue, which are driving concentration degrees relating to the operative side. A sum of a sequence of numbers in which each of the return time of the driving operation adaptability and the degree of fatigue is weighted according to each of the driving operation adaptability and the degree of fatigue, is estimated as the operative side return time. Instead of or in addition to this, for example, the return time estimation unit 31 may estimate a sum of a sequence of numbers in which the return time of each of the driving operation adaptability and the degree of fatigue is multiplied by a coefficient (including a positive or negative value) according to each of the driving operation adaptability and the degree of fatigue, as the operative side return time. Here, the operative side return time is a time band having a width, and thus, has a value from a minimum operative side return time Cmin to a maximum operative side return time Cmax.

For example, the drive switching ECU 20 includes a return time map in which a correlation between the magnitude of the parameter, the type and strength of the provided stimulation, and the return time for each parameter of the driving concentration degree is illustrated. The return time estimation unit 31 calculates the return time of each parameter using the magnitude of the current parameter and the type and strength of the provided stimulation with reference to the return time map. A method estimating the psychological side return time, the cognitive side return time, and the operative side return time by the return time estimation unit 31 is not limited to the method described above. The return time estimation unit 31 may estimate the psychological side return time, the cognitive side return time, and the operative side return time using a known method. The psychological side return time, the cognitive side return time, and the operative side return time may not be a time band, and thus, may have a single value (i.e., a value that does not have a width), respectively.

The stimulation control unit 23 calculates a total time of the maximum value of the psychological side return time, the maximum value of the cognitive side return time, and the maximum value of the operative side return time. In a case where the total time is equal to or less than a predetermined time, the stimulation control unit 23 causes the stimulating device 5 to provide a psychological side returning stimulation which causes the state of psychological side of the driver to be returned to the proper state, a cognitive side returning stimulation which causes the state of cognitive side of the driver to be returned to the proper state, and an operative side returning stimulation which causes the state of operative side of the driver to be returned to the proper state to the driver in this order. In a case where the total time is equal to or shorter than the predetermined time, the stimulation control unit 23 selects a standard pattern of providing the stimulation in an order of psychological side returning stimulation, cognitive side returning stimulation, and operative side returning stimulation, as the stimulation pattern. The stimulation control unit 23 provides the stimulation in the selected standard pattern. The total time may not be total of the maximum values, and for example, may be a total of minimum values, or may be a total of median values. In a case where the psychological side return time, the cognitive side return time, and the operative side return time are a single value, respectively, the sum of those values is the total value.

For example, the psychological side returning stimulus may be a sound provided from a sound generation unit of the stimulating device 5. The sound generation unit is part of a psychological side returning stimulation providing unit that provides a psychological side returning stimulus. For example, the cognitive side returning stimulation may be a light provided from a light generation unit of the stimulating device 5 and a vibration provided from a vibration generation unit of the stimulating device 5. The light generation unit and the vibration generation unit are part of a cognitive side returning stimulation providing unit that provides the cognitive side returning stimulus. For example, the operative side returning stimulus is an interior component movement provided from the interior movement unit of the stimulating device 5. The interior movement unit is part of an operative side returning stimulation providing unit that provides the operative side returning stimulus.

The stimulation control unit 23 may provide stimulation in the following patterns. For example, in a case where the total time is equal to or shorter than the predetermined time, as illustrated in FIG. 8A, the stimulation control unit 23 selects a "standard pattern" in which the cognitive side returning stimulus is subsequently provided immediately after the psychological side returning stimulus is provided and the operative side returning stimulus is subsequently provided immediately after the cognitive side returning stimulus is provided. Here, the time of starting of the providing of the psychological side returning stimulus is the time when the arrival window time is the predetermined time. The time of ending the providing of the operative side returning stimulation is the time when the host vehicle V arrives at the switching completion point. That is, the aggregated time of providing the stimuli satisfies the predetermined time. The time of providing the psychological side returning stimulus is assumed to be equal to or longer than the psychological side return time. The time of providing the cognitive side returning stimulus is assumed to be equal to or longer than the cognitive side return time. The time of providing the operative side returning stimulus is assumed to be equal to or longer than the operative side return time.

In a case where the total time is longer than the predetermined time, the stimulation control unit 23 overlaps at least any of the psychological side returning stimulation, the cognitive side returning stimulation, and the operative side returning stimulation such that the aggregated time of providing the stimulations (aggregated stimulating time) becomes the predetermined time, and then, selects an optimization pattern in which the overlapping is performed such that the aggregated stimulating time becomes the predetermined time, as the optimization pattern. The stimulation control unit 23 provides stimulation in the selected optimization pattern.

In a case where the total time is longer than the predetermined time, the stimulation control unit 23 selects, for example, an "optimization pattern" exemplified below according to the length of the psychological side return time, the cognitive side return time, and the operative side return time, respectively.

For example, as illustrated in FIG. 8B, the stimulation control unit 23 selects an "optimization pattern" in which the cognitive side returning stimulus is subsequently provided immediately after the psychological side returning stimulus is provided, and then, the operative side returning stimulus is provided while the cognitive side returning stimulus is provided. In the illustrated example, a second half of the time of providing the cognitive side returning stimulus and a first half of the time of providing the operative side returning stimulus overlap. Here, the time of starting the providing of the psychological side returning stimulus is the time when the arrival window time is the predetermined time. The time of ending the providing of the operative side returning stimulus is the time when the host vehicle V arrives at the switching completion point. That is, the aggregated time of providing the stimuli satisfies the predetermined time. The time of providing the psychological side returning stimulus is assumed to be the psychological side return time, the time of providing the cognitive side returning stimulus is assumed to be the cognitive side return time, and the time of providing the operative side returning stimulus is assumed to be the operative side return time.

For example, as illustrated in FIG. 8C, the stimulation control unit 23 selects an "optimization pattern" in which the cognitive side returning stimulus and the operative side returning stimulus are subsequently provided immediately after the psychological side returning stimulus is provided. In the example illustrated in the drawing, the entire time of providing the cognitive side returning stimulus and the entire time of providing the operative side returning stimulus overlap. Here, the time of starting the providing of the psychological side returning stimulus is the time when the arrival window time is the predetermined time. The time of ending the providing of the cognitive side returning stimulus and the operative side returning stimulus is the time when the host vehicle V arrives at the switching completion point. That is, the aggregated time of providing the stimuli satisfies the predetermined time. The time of providing the psychological side returning stimulus is assumed to be the psychological side return time, the time of providing the cognitive side returning stimulus is assumed to be the cognitive side return time, and the time of providing the operative side returning stimulus is assumed to be the operative side return time.

For example, as illustrated in FIG. 8D, the stimulation control unit 23 selects an "optimization pattern" in which the cognitive side returning stimulus and the operative side returning stimulus are subsequently provided together while the psychological side returning stimulus is provided earlier. In the illustrated example, the entire time of providing the cognitive side returning stimulus and the entire time of providing the operative side returning stimulus overlap. A part of the second half of the time of providing the psychological side returning stimulus and a part of the first half of the time of providing the cognitive side returning stimulus and the operative side returning stimulus overlap. Here, the time of starting the providing of the psychological side returning stimulus is the time when the arrival window time is the predetermined time. The time of ending the providing of the cognitive side returning stimulus and the operative side returning stimulus is the time when the host vehicle V arrives at the switching completion point. That is, the aggregated time of providing the stimuli satisfies the predetermined time. The time of providing the psychological side returning stimulus is assumed to be the psychological side return time, the time of providing the cognitive side returning stimulus is assumed to be the cognitive side return time, and the time of providing the operative side returning stimulus is assumed to be the operative side return time.

For example, as illustrated in FIG. 8E, the stimulation control unit 23 selects an "optimization pattern" in which the cognitive side returning stimulus is provided while the psychological side returning stimulus is provided, and the operative side returning stimulus is provided while the cognitive side returning stimulus is provided. In the illustrated example, a part of the second half of the time of providing the psychological side returning stimulus and a part of the first half of the time of providing the cognitive side returning stimulus overlap. A part of the second half of the time of providing the cognitive side returning stimulus and a part of the first half of the time of providing the operative side returning stimulus overlap. Here, the time of starting the providing of the psychological side returning stimulus is the time when the arrival window time is the predetermined time. The time of ending the providing of the cognitive side returning stimulus and the operative side returning stimulus is the time when the host vehicle V arrives at the switching completion point. That is, the aggregated time of providing the stimuli satisfies the predetermined time. The time of providing the psychological side returning stimulus is assumed to be the psychological side return time, the time of providing the cognitive side returning stimulus is assumed to be the cognitive side return time, and the time of providing the operative side returning stimulus is assumed to be the operative side return time.

For example, as illustrated in FIG. 8F, the stimulation control unit 23 selects an "optimization pattern" in which the operative side returning stimulus is provided while the psychological side returning stimulus is provided and the cognitive side returning stimulus is provided while the operative side returning stimulus is provided. In the illustrated example, a part of the second half of the time of providing the psychological side returning stimulus and a part of the first half of the time of providing the operative side returning stimulus are overlapping. A part of the second half of the time of providing the operative side returning stimulus and a part of the first half of the time of providing the cognitive side returning stimulus overlap. Here, the time of starting the providing of the psychological side returning stimulus is the time when the arrival window time is the predetermined time. The time of ending the providing of the cognitive side returning stimulus and the operative side returning stimulus is the time when the host vehicle V arrives at the switching completion point. That is, the aggregated time of providing the stimuli satisfies the predetermined time. The time of providing the psychological side returning stimulus is assumed to be the psychological side return time, the time of providing the cognitive side returning stimulus is assumed to be the cognitive side return time, and the time of providing the operative side returning stimulus is assumed to be the operative side return time.

Next, processing tasks executed by the drive assist apparatus 200 will be described with reference to the flowchart in FIG. 9.

Figure 9:
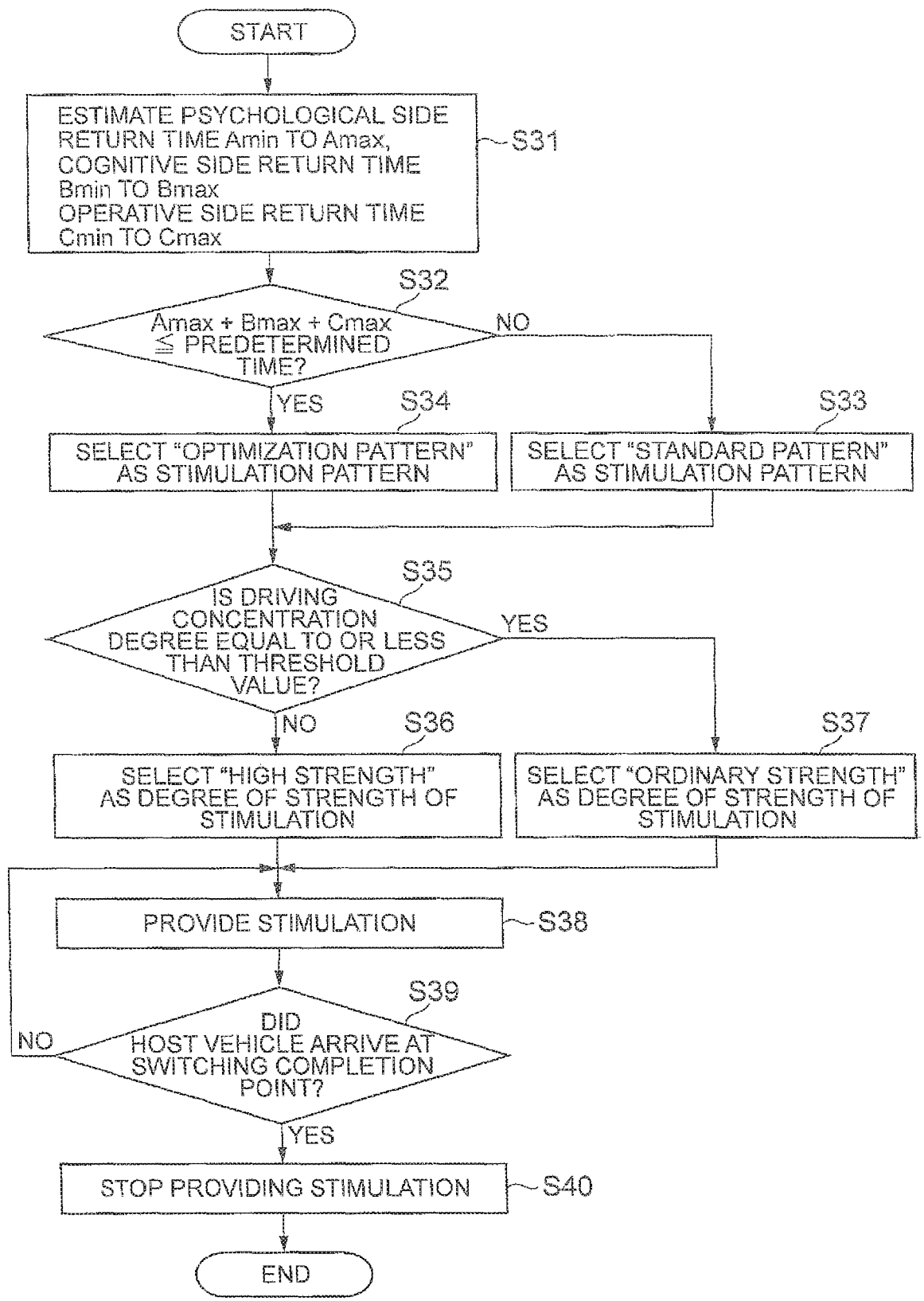
FIG. 9 is a flowchart illustrating stimulating processing of the drive switching ECU in FIG. 6.

FIG. 9 is a flowchart illustrating stimulation processing of the drive switching ECU 20. As illustrated in FIG. 9, in a case where the driving concentration degree is estimated by the driving concentration degree estimation unit 22, the drive switching ECU 20 of the drive assist apparatus 200 executes the following stimulation processing instead of the stimulation processing in the first embodiment (refer to FIG. 3).

The return time estimation unit 31 estimates the minimum psychological side return time Amin to the maximum psychological side return time Amax, the minimum cognitive side return time Bmin to the maximum cognitive side return time Bmax, and the minimum operative side return time Cmin to the maximum operative side return time Cmax based on the driving concentration degree estimated by the driving concentration degree estimation unit 22 (S31).

The stimulation control unit 23 determines whether or not the total time of the maximum psychological side return time Amax, the maximum cognitive side return time Bmax, and the maximum operative side return time Cmax is shorter than the predetermined time (S32). In a case of YES in S32, the stimulation control unit 23 selects the "standard pattern" as the stimulation pattern (S33). In a case of NO in S32, the stimulation control unit 23 selects an "optimization pattern" as the stimulation pattern (S34).

The stimulation control unit 23 determines whether or not the driving concentration degree is equal to or less than the threshold value (S35). In a case of YES in S35, the stimulation control unit 23 selects the "strong strength" as the strength of stimulation (S36). In a case of NO in S35, the stimulation control unit 23 selects the "ordinary strength" as the strength of stimulation (S37).

The stimulation control unit 23 controls and causes the stimulating device 5 to provide stimulation to the driver at the selected strength of stimulation and the selected stimulation pattern (S38). Whether or not the host vehicle V arrives at the switching completion point is determined (S39). For example, in S39 described above, the current arrival window time is calculated by the arrival window time calculation unit 21 and in a case where the current arrival window time is zero, it is determined that the host vehicle V arrives at the switching completion point. In a case of NO in S39, the process proceeds to S38 and stimulation is continuously provided to the driver. In a case of YES in S39, the stimulation control unit 23 stops providing stimulation (S40).

As described above, in the drive assist apparatus 200 in exemplary aspects of the application, the operational effect can be achieved in which smooth driving can be continued when the driving mode is switched from autonomous driving to manual driving. In addition, in the drive assist apparatus 200, the state of the driver can reliably be returned to the proper state before arriving at the switching completion point, and thus, it is possible to provide stimulation having an effective stimulation pattern according to the detailed state of the driver.

In a situation in which autonomous driving has to be ended and in a case where such ending position is determined, the drive assist apparatus 200 can select not only an appropriate strength of stimulation but also an appropriate stimulation pattern according to the state of the driver. In some cases depending on the state of the driver, switching of the driving mode from autonomous driving to manual driving cannot appropriately be completed before arriving at the switching completion point. In the drive assist apparatus 200, with assuming the above-described situation, a pattern necessary for returning to the proper state within the predetermined time can be estimated, and the switching of the driving mode can be executed.

Additionally, in the third embodiment, as is similar to the second embodiment, the strength of stimulation provided to the driver may be set as: the first strength in a case where the driving concentration degree is greater than the threshold value, the second strength in a case where the arrival window time is equal to or longer than the reference time set in advance and the driving concentration degree is equal to or less than the threshold value, and the third strength in a case where the arrival window time is shorter than the reference time and the concentration degree is equal to or less than the threshold value.

Some exemplary embodiments of the present disclosure are described as above, but the present invention is not limited to the embodiments described above and can be executed in various aspects. In the embodiments described above, the vehicle control ECU 10 and the drive switching ECU 20 may be integrally configured. A part of each function of the vehicle control ECU 10 and the drive switching ECU 20, that is, a part of the travel control unit 11, the arrival window time calculation unit 21, the driving concentration degree estimation unit 22, the stimulation control unit 23, the driving mode switching unit 24 and the return time estimation unit 31 may be executed by a computer in a facility such as an information processing center which is capable of communicating with the host vehicle V. In this case, the stimulating device 5 and the stimulation control unit 23 are part of a stimulation providing unit.

According to exemplary embodiments the present disclosure, it is possible to provide a drive assist apparatus in which smooth driving can be continued at the time when the driving mode is switched from autonomous driving to manual driving.

What is claimed is:

1. A driving assistance method for a host vehicle comprising:
   receiving a position of the host vehicle from a global positioning system (GPS);
   setting a target route on which the host vehicle travels to reach a destination set by a driver of the host vehicle based on the position of the host vehicle and a map information in a map database;
   generating a travel path plan of the host vehicle based on the target route, the position of the host vehicle, and a surrounding information acquired by a surroundings monitoring sensor;
   causing the vehicle to autonomously control based on the generated path plan whereby a driving mode of the host vehicle is an autonomous driving mode;
   determining, during the autonomous driving mode, whether a switching completion point to switch the driving mode from the autonomous driving mode to a manual driving mode is on the target route or not, based on A) the target route, B) the map information, and C) a traffic regulation information;
   calculating, in response to the determination, an arrival window time indicating an amount of time until the host vehicle will arrive at the switching completion point, based on the switching completion point, a host vehicle data, and the position of the host vehicle;
   determining whether or not the arrival window time is equal to or less than a predetermined time;
   causing, in response to the determination that the arrival time is equal to or less than the predetermined time, the host vehicle to control in a cooperative driving mode;
   providing stimulation to the driver of the host vehicle, from start to completion of the drive mode switching from autonomous driving to manual driving:
   estimating a return time using a return time estimation unit, wherein the return time is a time required for a state of the driver to be returned to a state suitable for the manual driving; and
   changing how the stimulation is provided based on whether the return time is estimated to be larger or smaller than a predetermined return time.

2. The driving assistance method according to claim 1, wherein the cooperative driving mode is executed from start to completion of the drive mode switching from autonomous driving to manual driving.

3. The driving assistance method according to claim 1, wherein the execution of the stimulation and the cooperative driving mode are completed when the arrival window time is equal to 0.

4. The driving assistance method according to claim 2, wherein the execution of the stimulation and the cooperative driving mode are completed when the arrival window time is equal to 0.

5. A driving assistance apparatus for a host vehicle comprising:
   a navigation system including a global positioning system (GPS) that receives a position of the host vehicle and a route setting unit that sets a target route on which the host vehicle travels to reach a destination set by a driver of the host vehicle based on the position of the host vehicle and a map information in a map database;
   a surroundings monitoring sensor that acquires surrounding information of the host vehicle;
   a vehicle control unit programmed to:
      generate a travel path plan of the host vehicle based on the target route, the position of the host vehicle, and the surrounding information acquired by the surroundings monitoring sensor;
      cause the vehicle to autonomously drive in an autonomous driving mode based on the generated path plan;
   a driving mode switching electronic control unit programmed to:
      determine, during the autonomous driving mode, whether a switching completion point to switch a driving mode from the autonomous driving mode to a manual driving mode is on the target route or not, based on A) the target route, B) the map information, and C) a traffic regulation information;
      calculate, in response to the determination, an arrival window time indicating an amount of time until the host vehicle will arrive at the switching completion point, based on the switching completion point, a host vehicle data, and the position of the host vehicle;
      determine whether or not the arrival window time is equal to or less than a predetermined time; and
      instruct the vehicle control unit, in response to the determination that the arrival window time is equal to or less than the predetermined time, to cause the host vehicle to drive in a cooperative driving mode, wherein the driving mode switching unit is further programmed to provide stimulation to the driver of the host vehicle, from start to completion of the drive mode switching from autonomous driving to manual driving, wherein the driving mode switching unit is further programmed to:
   estimate a return time, wherein the return time is a time required for a state of the driver to be returned to a state suitable for the manual driving, and
   change how the stimulation is provided based on whether the return time is estimated to be larger or smaller than a predetermined return time.

6. The driving assistance apparatus according to claim 5, wherein the cooperative driving mode is executed from start to completion of the drive mode switching from autonomous driving to manual driving.

7. The driving assistance apparatus according to claim 5, wherein the stimulation and the cooperative driving mode are completed when the arrival window time is equal to 0.

8. The driving assistance apparatus according to claim 6, wherein the stimulation and the cooperative driving mode are completed when the arrival window time is equal to 0.

* * * * *